United States Patent
Folkes et al.

(10) Patent No.: US 7,209,976 B2
(45) Date of Patent: Apr. 24, 2007

(54) PROTOCOL COMMUNICATION AND TRANSIT PACKET FORWARDING ROUTED BETWEEN MULTIPLE VIRTUAL ROUTERS WITHIN A SINGLE PHYSICAL ROUTER

(75) Inventors: Ronald P. Folkes, Dallas, TX (US); Lance A. Visser, Dallas, TX (US)

(73) Assignee: Jeremy Benjamin, Tel Aviv (IL)

( * ) Notice: Subject to any disclaimer, the term of this patent is extended or adjusted under 35 U.S.C. 154(b) by 901 days.

(21) Appl. No.: 10/196,393

(22) Filed: Jul. 16, 2002

(65) Prior Publication Data

US 2004/0073715 A1    Apr. 15, 2004

(51) Int. Cl.
G06F 15/173    (2006.01)

(52) U.S. Cl. .................. 709/238; 709/239; 709/242

(58) Field of Classification Search ........... 370/395, 370/395.21, 466; 709/229
See application file for complete search history.

(56) References Cited

U.S. PATENT DOCUMENTS

| 5,550,816 | A | 8/1996 | Hardwick et al. |
| 6,078,963 | A | 6/2000 | Civanlar et al. |
| 6,275,492 | B1 * | 8/2001 | Zhang .................. 370/392 |
| 6,351,465 | B1 * | 2/2002 | Han .................... 370/395.43 |
| 6,584,500 | B1 * | 6/2003 | Arkko .................. 709/223 |
| 6,658,481 | B1 * | 12/2003 | Basso et al. .............. 709/243 |
| 6,674,756 | B1 * | 1/2004 | Rao et al. ............... 370/395.21 |
| 6,711,152 | B1 * | 3/2004 | Kalmanek et al. ......... 370/351 |
| 6,963,924 | B1 * | 11/2005 | Huang et al. ............ 709/238 |
| 6,975,631 | B1 * | 12/2005 | Kastenholz ............. 370/401 |
| 7,042,884 | B2 * | 5/2006 | Huang et al. ........... 370/395.54 |

OTHER PUBLICATIONS

Cisco Systems, "Catalyst 8500 CSR Architecture," Cisco White Paper, 'Online!, Jul. 1998, pp. 1-19., San Jose, USA, Retrieved from the Internet: <URL:http://www.cisco.com/warp/public/cc/pd/si/casi/ca8500/tech/8510_wp.pdf>, 'retrieved on Sep. 19, 2003.

Aweya J, "On the design of IP routers Part 1: Router architectures," Journal of Systems Architecture, Elsevier Science Publishers BV., Amsterdam, NL, vol. 46, No. 6, Apr. 2000, pp. 483-511.

European Search Report for EP 03254356, mailed Oct. 29, 2003.

U.S. Appl. No. 09/896,228, Watson.

* cited by examiner

*Primary Examiner*—Ario Etienne
*Assistant Examiner*—Hussein El-chanti
(74) *Attorney, Agent, or Firm*—The Nath Law Group; Harold L. Novick

(57) ABSTRACT

Virtual routers within a single physical router share a centralized data plane containing a centralized switch fabric and a plurality of physical network interfaces, each assigned to only one virtual router. Using a logical cut-through device between a pair of virtual routers designated respectively client and server, packet forwarding information from the server is imported into the client, which creates, allocates, and maintains a data structure for the imported information, which then resides on the client interfaces. This imported forwarding information is then integrated into a single forwarding table that is used to recognize an incoming packet at the client and forward it appropriately out through a server interface with a single packet forwarding decision in a single transit through the switch fabric. Within a physical router, a client virtual router can communicate with multiple servers and can concurrently function as a server to multiple clients.

22 Claims, 2 Drawing Sheets

PROTOCOL COMMUNICATION AND TRANSIT PACKET FORWARDING ROUTED BETWEEN MULTIPLE VIRTUAL ROUTERS WITHIN A SINGLE PHYSICAL ROUTER

CROSS-REFERENCE TO RELATED APPLICATIONS

This application is related to and commonly assigned U.S. application Ser. No. 09/852,223, entitled "SYSTEM AND METHOD FOR TCP CONNECTION PROTECTION SWITCHING," filed May 9, 2001, now U.S. Pat. No. 6,953,617; and commonly assigned U.S. application Ser. No. 10/153,500, entitled "HIGHLY AVAILABLE OSPF ROUTING PROTOCOL," filed May 23, 2002; the disclosures of which are hereby incorporated herein by reference.

TECHNICAL FIELD

The present invention is related to communication system routers, and more particularly to a method to enable routing protocol communication and transit packet forwarding between virtual routers.

BACKGROUND OF THE INVENTION

FIG. 1 illustrates the operation of packet forwarding using longest prefix match forwarding tables on two prior art commercially available physically separate routers 11 and 12 connected by link 101. Router 12 has three interfaces if-1, if-2, and if-3 (respectively 121–123), and router 11 has two interfaces if-1 and if-2 (respectively 111 and 112). Each of routers 11 and 12 has respective packet forwarding table 13, 14 containing prefixes that include an IP network number and a mask length. For example, a prefix 10/8 is equivalent to an IP network number 10.0.0.0 with a mask length of 8 bits, such that only the first 8 bits of that IP network number are significant. Within packet forwarding tables 13, 14 are sets of these prefixes, for example, 10/8. Each prefix is associated with forwarding information, sometimes called "next-hop information." The forwarding information consists, in this case, of just the interface through which the packet is forwarded.

Router 11, for example, has an entry in forwarding table 13 having prefix 10/8 and associated next-hop information Interface if-2. Accordingly, if Router 11 receives a packet through any of its interfaces, it reads the IP destination address in the header of that packet and performs what is called a longest prefix match lookup in forwarding table 13. A longest prefix match lookup finds the longest prefix in forwarding table 13 that matches the packet IP destination address. For example, if a packet destination IP address is 10.1.1.1, where each of the values between the dots is a byte or an octet, and where each octet is 8 bits, clearly the prefix 10/8 matches the first 8 bits of the IP address.

On the other hand, a packet with IP destination address 13.2.3.4 does not match the first entry in forwarding table 13, because the first 8 bits do not match. The longest prefix match must match the most significant bits in the forwarding table 13. For example, with a packet IP destination address 10.1.1.1, the longest prefix match in forwarding table 13 is 10.1.1/24, because it has more significant bits that match this destination IP address than does 10/8. However, an entry like 10.2.2/24 would not match 10.1.1.1.

Assume for example that router 12 has prefix entry 10.1/16 with a next-hop of interface if-1, and prefix entry of 10.2/16 with a next-hop of interface if-2, in forwarding table 14. Then if Router 11 receives a packet with IP destination 10.1.1.1, router 11 will perform a longest prefix match in forwarding table 13 and will find a 10.1.1/24 entry that tells it to forward that packet out through interface if-2, where it will be received by router 12. Router 12 then performs the same longest prefix match in forwarding table 14. In this case, 10.1.1.1 IP destination on the packet it receives would match the 10.1/16 entry in forwarding table 14, which tells it to forward that packet out through interface if-1 on its way to the designated destination.

If router 11 receives a packet with, for example, IP destination 10.2.2.5, then router 11 would match that to 10.2.2/24 in its forwarding table and forward the packet out through interface if-2, where it would be received by router 12. Router 12 would do a lookup and would match the packet to 10.2/16, where it would forward the packet out through interface if-2.

BRIEF SUMMARY OF THE INVENTION

The present invention is directed to a system and method which enable routing protocol communication and transit packet forwarding between virtual routers within a single physical router. The virtual routers share a centralized data plane containing a centralized switch fabric and containing a plurality of physical network interfaces, each assigned to only one virtual router.

Using a logical cut-through device (CT) between a pair of virtual routers designated respectively as client and server, packet forwarding table information from the server is imported into the client, which creates, allocates, and maintains a data structure for the imported packet forwarding table information, so that the imported information from the server resides on the client interfaces. This imported packet forwarding information is then used by the client to recognize an incoming information packet and forward it out through an interface assigned to the server with a single packet forwarding decision in a single transit through the centralized switch fabric. Within a physical router, a client virtual router can communicate with multiple servers and can concurrently function as a server to multiple clients.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Cut-through routing is developed to enhance a previous invention called Virtual Routers (VRs) or Partitioning, which carves one single physical router into multiple virtual routers (see U.S. application Ser. No. 09/896,228, cited above, the disclosure of which has been incorporated herein by reference). From a user point of view, that is a very useful feature, but one drawback is that for two virtual routers to communicate with one another they must be connected together with real physical hardware. This requires for example buying two SONET line cards at tens of thousands of dollars each and connecting them together inflexibly.

Cut-through routing allows links between virtual routers without requiring inflexible physical equipment that represents those links. This reduces cost to the user and saves ports into the system, which are also a very expensive and critical resource.

Figure 1:
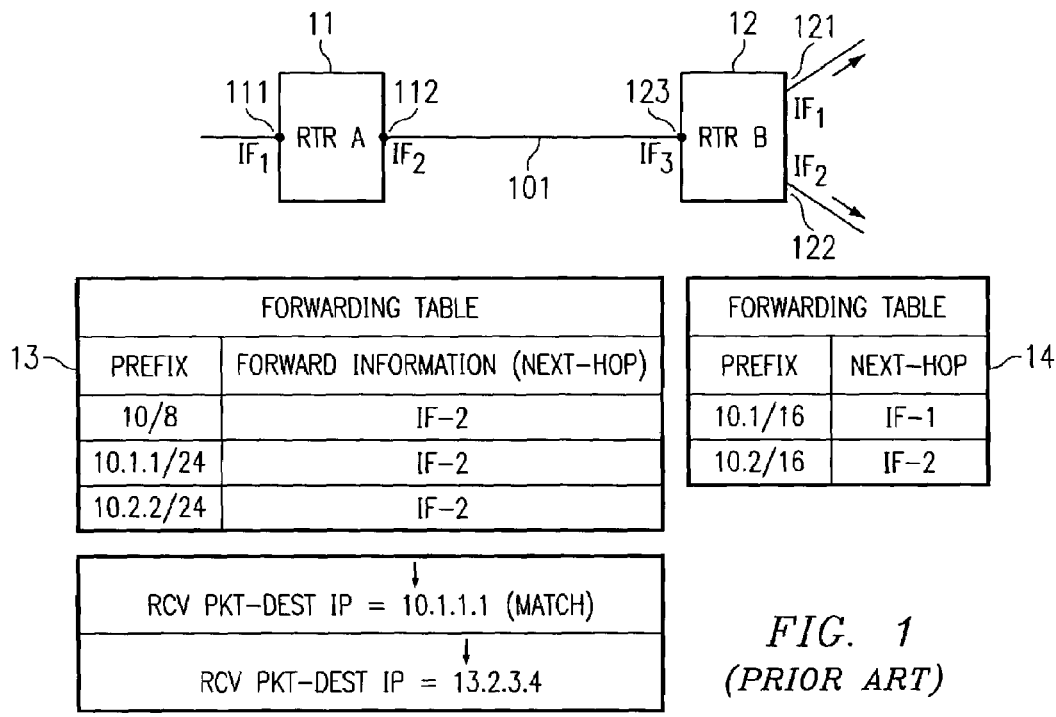
FIG. 1 illustrates the operation of packet forwarding using longest prefix match forwarding tables on two prior art commercially available physically separate routers.
Figure 2:
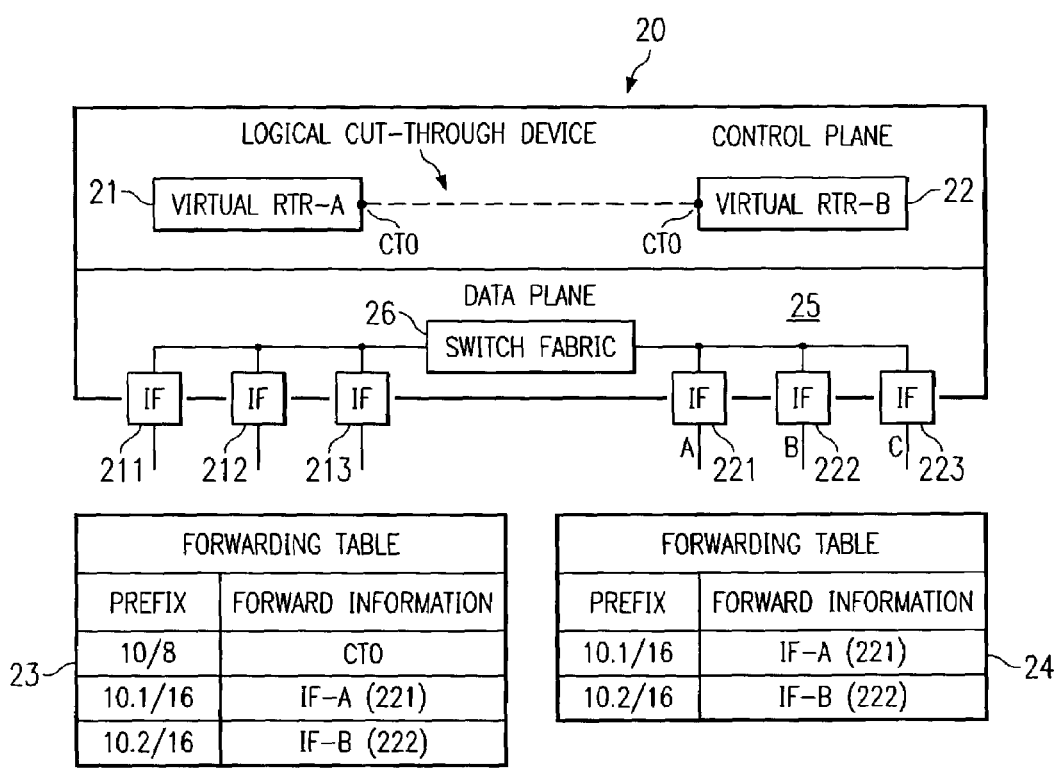
FIG. 2 represents schematically two separate control plane software instances running in two separate virtual router aspects of a single physical router.

In a virtual router architecture, routers 11 and 12, described previously in connection with FIG. 1, would represent two separate control plane software instances running in two separate virtual router aspects 21 and 22 of a single physical router 20, as illustrated in FIG. 2, although more than two virtual routers can occupy a single physical router. In that sense, virtual routers 21, 22 share a centralized data plane 25 and switch fabric 26. Physical network interfaces 211–213 through 221–223 in data plane 25 that are respectively assigned to either particular virtual router 21, 22 all have access to one another through centralized switch fabric 26.

With virtual router cut-through architecture, the two longest prefix match lookups and the two sequential packet forwarding operations described earlier with the two separate physical routers in connection with FIG. 1 are collapsed into a single packet forwarding longest prefix match lookup and a single packet forwarding decision. Accordingly, a single packet longest prefix match lookup in a forwarding table sends the packet through switch fabric 26 only one time to a designated egress interface in router 20.

Each virtual router 21, 22 has a unique set of assigned interfaces. The control plane software within each virtual router 21, 22 builds a packet forwarding table that is sent to each of these assigned interfaces, which the interfaces then use to perform their longest prefix match and packet forwarding operation through switch fabric 26. Because of virtual router partitioning, without virtual router cut-through, the interfaces assigned to one virtual router forward packets out through interfaces assigned to their own virtual router only and not through interfaces assigned to another virtual router. Although switch fabric 26 allows this cross-forwarding, the interfaces assigned to one virtual router, because of partitioning, do not recognize or know the existence of interfaces assigned to another virtual router. The principle behind virtual router cut-through is to import packet forwarding table information from one virtual router into another virtual router, so that it resides on the interfaces in the second virtual router, enabling them to recognize and forward packets out through interfaces assigned to the first virtual router.

The virtual router cut-through architecture relies on a cut-through device, which is essentially a logical software device between two virtual routers that exists in the operating system kernel. Within one virtual router, a route is created with the forwarding information or next-hop information that refers to the cut-through device to another virtual router. When a route points to a cut-through interface, that is an indication to the control plane software of a receiving virtual router that it needs to query the destination virtual router for information on how to forward the packets sent to that prefix.

Referring for example to FIG. 2, two virtual routers 21 and 22 have cut-through device zero (ct∅) on each virtual router 21, 22. Virtual router 21 has in its forwarding table 23 a prefix 10/8 with corresponding forwarding information of cut-through ∅ device. Logically if a packet is received in virtual router 21 that matches prefix 10/8, that packet acts logically as if forwarded to virtual router 22, and then forwarded out from virtual router 22 using its forwarding table 24. However, transit packets do not actually go over cut-through devices, but instead virtual router 21 asks virtual router 22 how to forward packets to the 10/8 prefix.

Then ACTIVE-BGP4 11 and BACKUP-BGP4 12 perform operations to establish running state synchronization. ACTIVE-BGP4 11 sends its running configuration to BACKUP-BGP4 12 through link 13.

In the previous discussion, virtual router 21 is the ingress and is also called the virtual router cut-through client. Virtual router 22 in this discussion is the egress and is also called the virtual router cut-through server. The client asks the server how to forward packets having a certain prefix. If a route in the routing table, or interchangeably a prefix specifies a cut-through device as its destination or forwarding information, then that route is called a cut-through route, and the cut-through device that it refers to is associated with a destination virtual router, equivalently termed the cut-through server. The client virtual router must ask the server virtual router for prefix information related to the cut-through route or cut-through prefix. The server virtual router has to return to the client all the prefixes related to the cut-through prefix. By related prefix is understood all those prefixes in the server destination virtual router that are either the same as the cut-through prefix, covered by the cut-through prefix, or cover the cut-through prefix. Here "equal" is clearly exactly identical; "covered by" means that significant bits of the longer network prefix in the server are the same as the significant bits in the client's shorter cut-through prefix; and "cover" is just the opposite, such that significant bits in the server's shorter prefix entry are equal to the same significant bits in the client's longer cut-through prefix, for example prefix 10/8 covers prefix 10.1/16.

Figure 3:
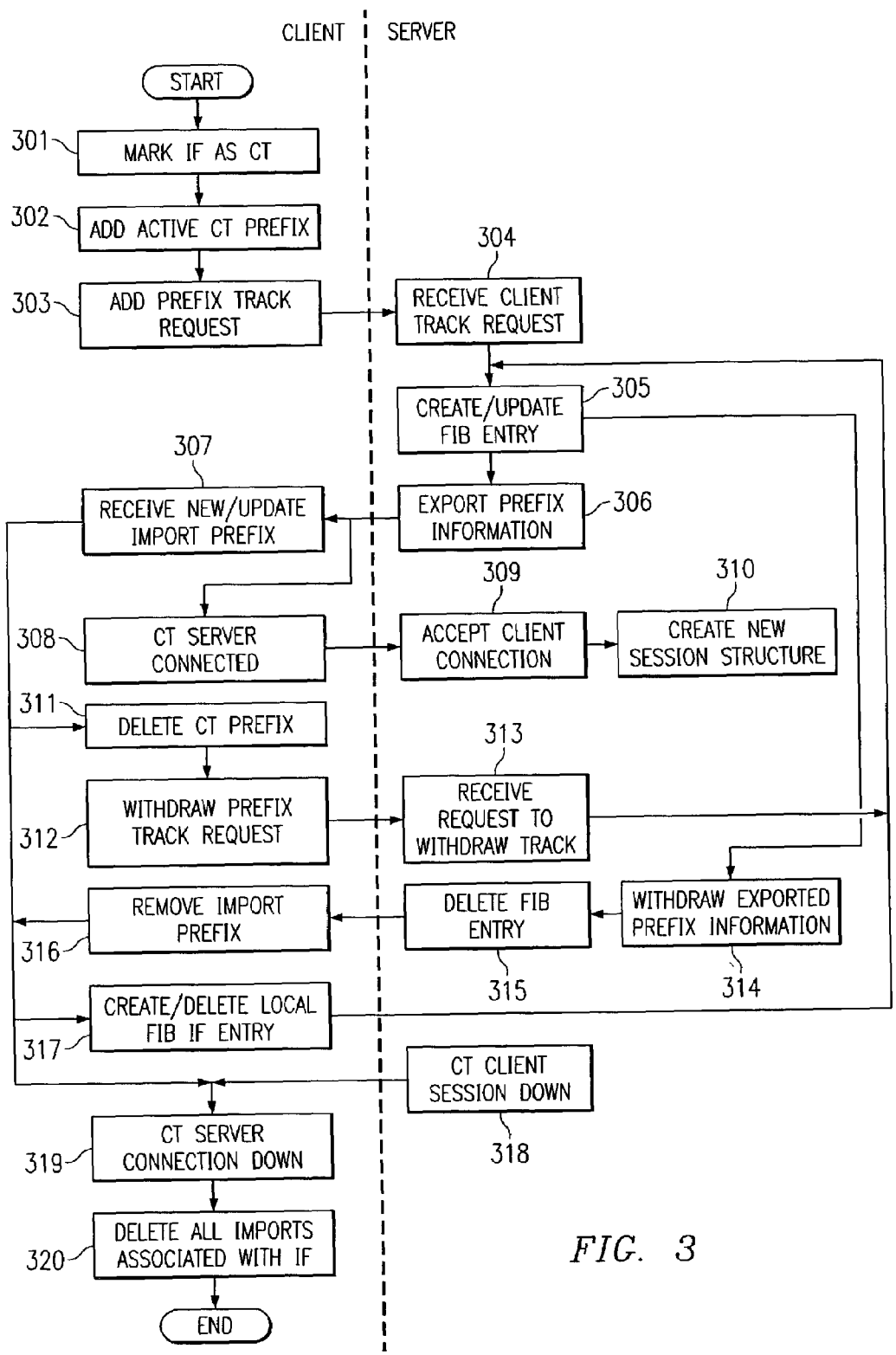
FIG. 3 is a flow diagram depicting virtual router cut-through operation, in accordance with embodiments of the present invention.

FIG. 3 is a block diagram representing the state of HA instances ACTIVE-BGP4 11 and BACKUP-BGP4 12 during fail-over and recovery. At step 301, after all connected BGP peers 14, 15, 16 are marked SYNCHRONIZED, as described above in connection with FIG. 2 and as indicated at step 300 in FIG. 3, ACTIVE-BGP4 11 is marked ACTIVE-PROTECTED and BACKUP-BGP4 12 is marked BACKUP-PROTECT. When active BGP4 instance 11 has copied all of its route database to backup BGP4 instance 12 and has cloned all its established peer connection sockets, it enters an ACTIVE-PROTECTED state. At the same time, backup BGP4 instance 12 enters a BACKUP-PROTECT state. After this state is reached, if ACTIVE-BGP4 11 fails at step 302, then at step 303 BACKUP-BGP4 12 transitions to become new ACTIVE-BGP4 12, and will start to listen for new connections and to send updates, while failed ACTIVE-BGP4 remains offline.

If a cut-through route is created on a client, i.e., a route with next-hop information that refers to a logical cut-through device, then that client asks the server virtual router for information related to the prefix, and the server creates a tracking prefix, or allocates a structure and creates an entry in a table that records the fact that that client is requesting information related to this specific prefix. At the same time, this server virtual router reads through its forwarding table, identifies all of the related prefixes, and sends messages to the client with information on those prefixes. When the client receives those messages from the server, it creates structures in a table called imported prefixes. Each of these latter structures contains a specific prefix received from the server.

Based on what the client had for its cut-through route and the imported information received from the server, the client creates additional forwarding table entries, referred to as cut-through Forwarding Information Base (FIB) entries. The cut-through FIB entries contain prefixes that are derived from the union of the cut-through route and the imported information, along with egress information specifying the interfaces in the server virtual router. All of these structures are updated, such that if the cut-through route on a client is updated or changes, then the cut-through server is informed appropriately. For example, if the cut-through prefix on the client is deleted, then the tracking request on the server is withdrawn, so that the server does not continue to send information on related prefixes. Similarly, if the server's forwarding table is updated, such that it updates a prefix that is related to one that it is tracking for a client, then it needs to send the appropriate update information to that client, so that the client can update its forwarding table.

The client code maintains various lists of data structures to contain the cut-through state. First, the client maintains a list of session structures, one for each destination server VR. The client maintains a single table of cut-through prefixes to all destination server VRs. Note that the code actually uses various data structures such as hash tables and doubly linked lists, as well as Patricia (Radix) trees, known in the art, for efficiency.

One task of the cut-through client is to determine when imported prefixes can be deleted. In order to do this, the client maintains a reference count on each import. The reference count indicates the number of active cut-through prefixes that are related to the import. When a cut-through prefix is deleted, the reference count on all related imports is decremented. In particular, the client decrements the reference count on every import that is covered by the active cut-through prefix as well as every import that the active prefix covers. When an import's reference count becomes zero, it indicates that there are no related cut-through prefixes, and the import can be deleted.

The main task of the cut-through client is to create FIB prefix entries based on the set of active cut-through prefixes and the set of imported prefixes. The following rules apply.

The client cannot create a FIB prefix that is less specific than a cut-through prefix. For example, if the client has a cut-through prefix of 10.1/16 and an import of 10/8, it cannot create a FIB entry for 10/8. It must create the FIB entry for 10.1/16.

Prefixes to local interfaces take precedence. For example, if the client has a cut-through prefix of 10/8, an import of 10.1/16 and a local interface FIB entry for 10.1/16. The client cannot create any cut-through FIB entries.

At any one time, a cut-through FIB entry is associated with one (and only one) cut-through prefix and one (and only one) imported prefix. That is, the combination of one cut-through prefix and one imported prefix can produce one cut-through FIB entry. As a result, the count of cut-through FIB entries is less than or equal to the count of cut-through prefixes plus the count of imported prefixes.

The combination of an active cut-through prefix and an imported prefix yields a FIB entry as follows:

If the active cut-through prefix is the same as the imported prefix, the cut-through FIB prefix is the same as both prefixes.

If the active cut-through prefix is more specific than the import, the cut-through FIB prefix is equal to the active cut-through prefix.

If the imported prefix is more specific than the active cut-through prefix, the cut-through FIB prefix is equal to the import prefix.

In any event, the client must perform the following checks before actually adding the cut-through FIB prefix.

If there is already a FIB entry for the cut-through FIB prefix, the client does not add the cut-through FIB prefix.

If the best (longest prefix match) RIB entry covering the cut-through FIB prefix IP address is not an active cut-through prefix, the client does not add the cut-through FIB prefix.

The client implements data structures having the following relationships.

A cut-through FIB entry is always associated with the best match active cut-through prefix. That is, it is associated with the cut-through prefix that has the longest-prefix match covering the cut-through FIB IP address.

A cut-through FIB entry is always associated with the best match import prefix. That is, it is associated with the import that has the longest-prefix match covering the cut-through FIB IP address.

All cut-through FIB entries associated with an active cut-through prefix are linked together.

All cut-through FIB entries associated with an import prefix are linked together.

FIG. 3 is a flow diagram depicting virtual router cut-through operation, in accordance with embodiments of the present invention. In the diagram, steps that occur primarily in the client VR are shown in the left portion of the figure, whereas steps that are performed primarily in the destination server VR are shown in the right portion. At step 301, an interface is marked in the client as a logical cut-through device. In some implementations, a fixed set of interfaces is permanently marked as cut-through. Step 301 then basically occurs at system boot time and at any subsequent reconfiguration of virtual routers, when the system detects these logical cut-through devices. This essentially creates a communication path to the destination virtual router associated with each cut-through device. An algorithm for step 301 is essentially:

Determine if there is already a cut-through session/connection with the destination VR.

```
If there is already a session
    Increment the reference count on the session
Else
    Allocate a new session structure, initialize and insert into list
    Start connect ( ) processing to connect to server VR.
```

Steps 302 and 303 create a route on the client that contains forwarding (or next-hop) information that refers to a logical cut-through device, and sends a request to the destination or server virtual router requesting related prefixes. When adding the cut-through prefix, the existing set of import information is examined to see if the new cut-through prefix will result in new cut-through FIB entries when the new cut-through prefix is combined with the existing imports, creating cut-through FIB entries as needed, essentially in accordance with the algorithm:

Allocate and initialize a new data structure for the active cut-through prefix.
  Insert this data structure into the list of active cut-through prefixes.
  Send a tracking prefix request to the destination/server VR.
  Determine if the new active cut-through prefix is a better match for cut-through FIB entries associated with other cut-through prefixes. If so, change these cut-through FIB entries to be associated with the new active cut-through prefix.
  Find the best match (longest prefix match) import that covers the IP address in the active cut-through prefix. If found, determine if the client needs to create a cut-through FIB entry and create it if needed.
  For every related import
    Increment the reference count on the import.
    If the combination of the new cut-through prefix and the import yields a required cut-through FIB entry, create one.

At step 304, the server receives the client tracking request for prefix in accordance with the algorithm:

```
If a tracking entry for the prefix already exists,
    Add the client VR number to the list of clients tracking
Else
    Allocate and initialize a new tracking request structure, add to list
For each FIB entry related to the tracking prefix
    Send (export) the prefix to the client.
```

At steps 305 and 306, the server creates a new or updates an existing FIB entry using essentially the algorithm:
  For each tracking prefix related to the FIB prefix
    For each client registered in the tracking structure
      Send (export) the prefix to the client.

At step 307, an imported new prefix or update from the server or destination virtual router is combined on the client with cut-through routes to create cut-through FIB entries. If the server changes the next-hop information related to a prefix that it is tracking for a client, then it will send an update to that client with the new next-hop information. Applicable algorithms are:
  Allocate and initialize a new data structure for the import prefix.
  Insert this data structure into the list of import prefixes for the server VR.
  Determine if the new import prefix is a better match for cut-through FIB entries associated with other import prefixes. If yes,
  Change these cut-through FIB entries to be associated with the new import.
  Update the next-hop information in the cut-through FIB entry with the next-hop information from the new import.
  For every related active cut-through prefix (covered by the import or covering the import)
    Increment the reference count on the import.
    If the combination of the new import and the active cut-through prefix yields a required cut-through FIB entry, create one.

An integrated FIB is created and maintained on the client using information imported from any/all cut-through servers, as well as information for local FIB entries (local interfaces). The cut-through import information is combined with the cut-through prefix information to create cut-through FIB entries. As described above, local FIB entries take precedence over cut-through FIB entries. Local FIB entries are not combined with cut-through FIB entries. Cut-through FIB entries are not combined with each other. Only one cut-through prefix to a particular destination is active at any one time. This means that at most only one cut-through FIB entry for a particular destination exists at any one time.

At step 308, when the connection from client VR to cut-through server is established:
  For each active cut-through prefix to the server VR
  Send a prefix tracking request to the server VR.

At steps 309–310, when the connection from the client is accepted:
  Create a new session structure and add to the session list.

At step 311, when a cut-through prefix is deleted, at step 312 a message to the server asks the server to stop tracking that prefix, so that it does not unnecessarily need to send messages to the client. The client examines its cut-through FIB entries to see if any of them are no longer valid because of the deleted cut-through route.

The applicable algorithm is essentially:
  Send request to destination/server VR to stop tracking the prefix.
  For each cut-through FIB entry associated with the active cut-through prefix

```
If the cut-through FIB prefix is more specific than its associated
    import
        Delete the cut-through FIB prefix
Else
    If there is another cut-through prefix to the same destination VR
    Associate the cut-through FIB prefix with best match active
    cut-through prefix
Else
    Delete the cut-through FIB prefix
    For each import related to the active cut-through prefix
    Decrement the reference count on the import
    If the import reference count is 0
        Free the import
    Free the active cut-through structure.
```

At step 313, the server receives the request to stop tracking prefix, and performs the algorithm:
  Clear the client VR number from the list of clients tracking the prefix
  If there are no other clients tracking the prefix
    Remove the tracking structure from the list and free it.

At step 314, a withdraw exported prefix information message is sent from a cut-through server to a cut-through client to indicate that a previously exported prefix is no longer valid on the server.

At step 315, the server deletes the applicable FIB entry, and performs the algorithm:

For each client to which the prefix was exported
        Send withdraw prefix message to client.

At step 316, the client receives a withdraw prefix message from the cut-through server. If the server deletes a forwarding table entry, meaning that it can no longer reach that destination, and that forwarding table entry is related to a prefix that it is tracking for a cut-through client, then the server sends a message to that client telling it that that destination is no longer reachable. The client then inspects its cut-through FIB entries and determines which ones it needs to delete based on that message from the server. The client performs the algorithm:

Remove the import from list of imports from the server
    For each cut-through FIB entry associated with the import

---

If the cut-through FIB prefix is more specific than its associated
    Active cut-through prefix
        Delete the cut-through FIB prefix
Else
    Find the next-best match import covering the cut-through FIB prefix
    If found
        Move the cut-through FIB prefix to be associated with the import
        Change the next-hop information in the cut-through FIB entry to that of the new covering import
    Else
        Delete the FIB entry
Free the import structure.

---

At step 317, the client creates or deletes a local FIB forwarding table entry that refers to a local interface, that is an interface that actually belongs to the client virtual router. If a cut-through client creates a local forwarding table entry, then that takes precedence over any cut-through FIB entry. Accordingly, the client, if it finds a cut-through FIB entry that is the same as or more specific than the local FIB entries, then deletes those cut-through FIB entries, and they are replaced by the local one. The operable algorithm is:

For each active cut-through prefix covering the local FIB entry
        For each cut-through FIB entry associated with the active cut-through prefix
            If the cut-through FIB prefix is more specific than the local FIB Prefix
                Delete the cut-through FIB prefix.

Similarly, when the client deletes a local FIB entry, the client may reactivate cut-through FIB entries that have been covered or superseded by the local FIB entries created, according to the algorithm:

Find the longest prefix match active cut-through covering the local FIB prefix
    For each import prefix covered by the active cut-through prefix
        If a cut-through FIB entry is needed for the prefix created by the combination of the active cut-through prefix and the import
            Create the cut-through FIB entry.

At step 318, if the connection from the client goes down, for example, if the client virtual router gets shut down for whatever reason, the server inspects its list of tracking prefixes and frees or removes all the entries that were related to that client and are no longer pertinent or allocated in the server. The operable algorithm is:

For each tracking prefix
        Clear client VR number from clients tracking
        If no other clients tracking the prefix
            Remove tracking structure from list and free.

At step 319, the connection to a cut-through server goes down, and the client flushes all the imports received from that server, which in turn removes all the cut-through FIB entries that relate to that destination virtual router. An operable algorithm is:

For each import from server
        Perform processing as if import were deleted.

At step 320, the interface is already disabled. This ensures that all cut-through prefixes to the interface are already deleted. The only action required is to delete all imports associated with the session and to close the connection.

Some implementations have a permanent set of logical cut-through devices to every virtual router in the system. In those implementations, it is not possible to remove the cut-through attribute from a logical cut-through interface.

At step 308 a client successfully connects to a cut-through server. At step 301 this connection process to a cut-through server starts when the client first sees the cut-through device to that server. At step 308 that connection is complete, and essentially the client sends a tracking prefix to the server for all the cut-through routes that refer to that server.

Route transitions that can occur on the client involve local routes, that refer to physical interfaces belonging to the client VR, and cut-through routes, that refer to cut-through devices associated with destination VRs. Various route transitions on the client in general have an ordering associated with them. For example, a client would not add a cut-through prefix at step 302 until the connection process to the cut-through server had been established at step 301. The active cut-through prefix delete at step 311 clearly cannot occur until after it has been added at step 302. In general the client will not receive an import prefix from the server at step 307 until it has added a cut-through prefix at step 302 and requested the server to track that prefix at step 303. Similarly, at step 307 the client would not receive an update to an import prefix until after it has initially received the import from the server the first time. Again, the import withdrawn by the server at step 316 would not occur until after the client had received the initial import at step 307.

The local FIB entry creation/deletion at step 317 can occur at any time, but it only impacts the cut-through if a cut-through FIB entry is already created based on adding a cut-through prefix and receiving import from the server at step 307. The connection to cut-through server down at step 319 can occur any time after the connection has been established at step 308. A local route can be created at any time, whereas a cut-through route would normally be created only after the connection to the cut-through server is established. In either case, a cut-through route cannot be updated until it is created and a local route cannot be updated until it has been created. Local route deleted and cut-through route deleted cannot occur until they have been respectively created.

Among data structures related to the virtual router cut-through, the server maintains a list of tracking prefixes which are just the set of all the prefixes from all the clients that have asked for related prefix information from that server. Whenever the server updates its forwarding table information, it can consult the list of tracking prefixes to determine if it needs to send a message to a cut-through client, telling the cut-through client what is occurring with those prefixes.

At step 304, the server receives a prefix tracking request from a client. The server in that case allocates a structure in a table to maintain that tracking request for future use. At that time, the server also goes through its forwarding table and sends to the client all the information for prefixes that are related to the tracking prefix, in other words the prefix that is equal to the tracking prefix, prefixes that are covered by the tracking prefix, and prefixes that cover the tracking prefix.

At step 313, the server receives a request to stop tracking a prefix. When the client has deleted its cut-through route at step 311, then it will send a message to the server to stop tracking that prefix. In this case, all the server has to do is just remove that tracking request and free it.

At steps 305–306, the server creates a new forwarding table or FIB entry. The server has to go through its list of tracking prefixes and find all that are related to the new forwarding table entry, and for each one it finds that is related, it sends information to the respective client for that tracking request. When the server modifies an existing forwarding table entry (in this case 'modify' just means to change the forwarding or next-hop information, for example the egress interface), it goes through the list of tracking structures and sends a message to each client tracking related prefixes to tell those clients about the new forwarding information.

At step 315, the server deletes a forwarding table entry and sends a message to each client that had received the prefix, telling that client that that prefix is no longer valid.

At steps 309–310, the connection from a client is accepted, and the server records that there is a new session connecting it to a new client.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to enable routing protocol communication and transit packet forwarding between multiple virtual routers within a single physical router, said method comprising the steps of:

providing a single physical router having within said router multiple virtual routers sharing a centralized data plane and a centralized switch fabric and said physical router containing a plurality of physical network interfaces, each said interface being assigned to only one said virtual router, such that within said physical router a client virtual router can communicate with multiple servers and can concurrently function as a server to multiple clients;

creating a logical cut-through device;

using said logical cut-through device (CT) between a first virtual router designated as client and a second virtual router designated as server to import packet forwarding table information from said server into said client:

creating, allocating, and maintaining at said client a data structure for said imported packet forwarding table information such that said imported information is integrated into a single forwarding table that resides on said interfaces assigned to said client: and applying said imported packet forwarding table information at said client to recognize and forward an information packet out through an interface assigned to said server using a single packet forwarding decision in a single transit through said centralized switch fabric;

creating a route at said client that contains a first prefix that refers to a network destination and that specifies forwarding information that refers to said CT;

sending g a request from said client to said server requesting prefixes related to said first prefix;

exporting said related prefixes and forwarding information from said server to said client;

allocating and initializing at said server a tracking request structure related to said first prefix;

creating and/or updating at said server a forwarding information base FIB entry related to said first prefix;

associating an imported prefix entry with the FIB entry; and maintaining by said client a reference count on each imported prefix entry equal to the number of active first prefix entries related to said imported prefix:

such that if an active first prefix entry is added, then said reference count is incremented for each related imported prefix entry; whereas if an active first prefix entry is deleted, then decrementing said reference count for each related imported prefix entry such that if said reference count becomes zero for an imported prefix entry, then said client deletes that imported prefix entry.

2. The method of claim 1 wherein a single packet longest prefix match lookup in said integrated forwarding table that includes imported packet forwarding table information forwards said packet out through said interface assigned to said server.

3. The method of claim 1 wherein said prefixes related to said first prefix comprise all those prefixes in said server that are either the same as, are covered by, or cover said first prefix.

4. The method of claim 1 wherein said client creates and/or deletes FIB entries related to local interfaces assigned to said client.

5. The method of claim 4 wherein prefixes related to said local interfaces take precedence over prefixes related to said imported packet forwarding table information at said client, such that said client cannot create an entry in said imported packet forwarding table information having a prefix that is the same as a prefix related to a local interface entry.

6. The method of claim 1 wherein said client creates a FIB entry related to said imported packet forwarding table information only if the prefix of such FIB entry is at least as specific as said corresponding prefix requested by said client from said server.

7. The method of claim 1 wherein, if said data structure at said client is updated, then:
said client informs said server of said updates;
any tracking request at said server relating to an entry deletion is withdrawn; and
said server ceases to send information to said client regarding deleted prefixes.

8. The method of claim 1 wherein, if said FIB information that said server is tracking for a client is updated, then said server informs that client of said updates; and
said client updates its forwarding table.

9. The method of claim 1 wherein said logical cut-through device is permanently marked and is activated automatically at system boot time.

10. The method of claim 1 wherein said client is a client to multiple virtual router servers within a single physical router.

11. The method of claim 10 wherein said client is concurrently a server to multiple virtual router clients within said single physical router.

12. A system for enabling routing protocol communication and transit packet forwarding between multiple virtual routers, comprising:
at least two virtual routers within a single physical router, said physical router incorporating:
a centralized data plane and a centralized switch fabric, the virtual routers sharing the centralized data plane and centralized switch fabric and said single physical router;
a plurality of physical network interfaces, each said interface being assigned to only one said virtual router such that within said physical router a client virtual router can communicate with multiple servers and can concurrently function as a server to multiple clients; and
a logical cut-through device (CT) communicating between a first virtual router designated as client and a second virtual router designated as server, said client operable:
to create said logical cut-through device;
to import packet forwarding table information from said server;
to apply said imported packet forwarding table information at said client to recognize and forward an information packet out through an interface assigned to said server using a single packet forwarding decision in a single transit through said centralized switch fabric;
to create a route at said client that contains a first prefix that refers to a network destination and that specifies forwarding information that refers to said CT;
to send g a request from said client to said server requesting prefixes related to said first prefix;
to export said related prefixes and forwarding information from said server to said client;
to allocate and initialize at said server a tracking request structure related to said first prefix;
to create and/or updating at said server a forwarding information base FIB entry related to said first prefix;
to associate an imported prefix entry with the FIB entry; and
to maintain by said client a reference count on each imported prefix entry equal to the number of active first prefix entries related to said imported prefix:
such that if an active first prefix entry is added, then said reference count is incremented for each related imported prefix entry; whereas
if an active first prefix entry is deleted, then decrementing said reference count for each related imported prefix entry such that
if said reference count becomes zero for an imported prefix entry, then said client deletes that imported prefix entry.

13. The system of claim 12 wherein said client is operable to apply a single packet longest prefix match lookup in said imported packet forwarding table information to forward said packet out through said interface assigned to said server.

14. The system of claim 12 wherein said prefixes related to said first prefix comprise all those prefixes in said server that are either the same as, are covered by, or cover said first prefix.

15. The system of claim 12 wherein said client is operable to create and to delete FIB entries related to local interfaces assigned to said client.

16. The system of claim 15 wherein said client is not operable to create an entry in said imported packet forwarding table information having a prefix that is the same as a prefix related to a local interface entry.

17. The system of claim 12 wherein said client is operable to create a FIB entry related to said imported packet forwarding table information only if the prefix of such FIB entry is at least as specific as said corresponding prefix requested by said client from said server.

18. The system of claim 12 wherein, if said data structure at said client is updated, then:
said client is operable to inform said server of said updates;
said client is operable to withdraw any tracking request at said server relating to an entry deletion; and
said server is operable to cease sending information to said client regarding deleted prefixes.

19. The system of claim 12 wherein, if said FIB information that said server is tracking for a client is updated, then said server is operable to inform that client of said updates; and
said client is operable to update its forwarding table.

20. The system of claim 12 further operable to permanently mark said logical cut-through device and to activate said logical cut-through device automatically at system boot time.

21. The system of claim 12 wherein said client is a client to multiple virtual router servers within a single physical router.

22. The system of claim 21 wherein said client is concurrently a server to multiple virtual router clients within said single physical router.

* * * * *